United States Patent [19]

Chang et al.

[11] Patent Number: 5,641,827
[45] Date of Patent: Jun. 24, 1997

[54] TRACKING AND EROSION RESISTANT COMPOSITION

[75] Inventors: Rong Jong Chang, Fremont; Linas Mazeika, San Carlos, both of Calif.

[73] Assignee: Raychem Corporation, Menlo Park, Calif.

[21] Appl. No.: 585,233

[22] Filed: Mar. 20, 1996

[51] Int. Cl.$^6$ .................................................. C08K 3/10
[52] U.S. Cl. ..................... 524/431; 524/401; 524/430; 524/432; 524/433; 524/435; 524/436
[58] Field of Search ........................... 524/401, 430, 524/431, 432, 433, 435, 436

[56] References Cited

U.S. PATENT DOCUMENTS

| | | | |
|---|---|---|---|
| 3,711,520 | 1/1973 | Pfeifer et al. | 260/375 B |
| 3,821,140 | 6/1974 | Milbert | 260/18 S |
| 3,839,266 | 10/1974 | Bargain | 260/37 B |
| 3,862,082 | 1/1975 | Hatanaka et al. | 260/37 SB |
| 3,965,065 | 6/1976 | Elliott | 260/37 SB |
| 3,969,308 | 7/1976 | Penneck | 260/37 SB |
| 4,001,128 | 1/1977 | Penneck | 252/63.2 |
| 4,100,089 | 7/1978 | Cammack II et al. | 252/63 |
| 4,110,300 | 8/1978 | Matsusbita | 260/37 SB |
| 4,189,392 | 2/1980 | Penneck et al. | 252/63.2 |
| 4,288,360 | 9/1981 | Bobear | 260/37 B |
| 4,399,064 | 8/1983 | Penneck | 523/173 |
| 4,419,474 | 12/1983 | Achermann et al. | 524/195 |
| 4,431,861 | 2/1984 | Clabburn et al. | 174/73 R |
| 4,521,549 | 6/1985 | Penneck | 523/173 |
| 4,604,424 | 8/1986 | Cole et al. | 524/862 |
| 4,822,830 | 4/1989 | Adkins | 523/203 |
| 4,897,027 | 1/1990 | Szaplonczay et al. | 425/117 |
| 5,008,317 | 4/1991 | Wolfer et al. | 524/262 |
| 5,023,295 | 6/1991 | Bosch et al. | 524/783 |
| 5,369,161 | 11/1994 | Kunieda et al. | 524/266 |

FOREIGN PATENT DOCUMENTS

| | | | |
|---|---|---|---|
| 0 218 461 A2 | 4/1987 | European Pat. Off. | H01B 3/46 |
| WO95/06552 | 3/1995 | WIPO | B29C 33/30 |

OTHER PUBLICATIONS

Derwent WPI Abstract No. 76–82267X/44 (abstract of JP–50–097644 (Toshiba Silicone).

*Primary Examiner*—Edward J. Cain
*Attorney, Agent, or Firm*—Herbert G. Burkard; Yuan Chao

[57] ABSTRACT

A tracking and erosion resistant composition includes (a) 100 parts by weight of organopolysiloxane; (b) between 1 and 15 parts by weight of magnesium oxide; (c) between 15 and 45 parts by weight of zinc oxide and (d) between 5 and 40 parts by weight of iron oxide.

7 Claims, 1 Drawing Sheet

TRACKING AND EROSION RESISTANT COMPOSITION

TECHNICAL FIELD OF THE INVENTION

This invention provides tracking and erosion resistant compositions, especially organopolysiloxanes, which are suitable as high voltage insulation materials and which are readily moldable into complex shapes.

BACKGROUND OF THE INVENTION

Two factors affecting the performance of a high voltage insulating material are its tracking resistance and its erosion resistance. Tracking refers to the formation of conducting paths (tracks) of deteriorated material on the surface of the insulating material, caused by surface electric discharges. A tracking failure occurs when a track bridges the gap between two or more conductors, leading to an electrical breakdown. Erosion refers to the progressive wearing away of the insulating material by the electrical discharges, with failure eventually occuring because too much insulating material has been worn away.

Organopolysiloxanes (also called silicones) are common high voltage insulating materials, because of their electrical properties, processability (including moldability), physical properties, chemical inertness and other desirable characteristics. Organopolysiloxanes employed in high voltage equipment typically contain additives for enhancing their tracking and/or erosion resistance (hereinafter referred to as anti-tracking additives).

One well-known anti-tracking additive is alumina hydrate (also referred to as aluminum hydroxide, alumina trihydrate, hydrated alumina or ALTH) alone or in combination with other additives such as metal oxides. Illustrative disclosures relating to alumina hydrate include Elliot, U.S. Pat. No. 3,965,065 (1976); Penneck, U.S. Pat. No. 3,969,308 (1976); Penneck, U.S. Pat. No. 4,001,128 (1977); Cammack, II et al., U.S. Pat. No. 4,100,089 (1978); Penneck et al., U.S. Pat. No. 4,189,392 (1980); Penneck, U.S. Pat. No. 4,399,064 (1983); Clabburn et al., U.S. Pat. No. 4,431,861 (1984); Penneck, U.S. Pat. No. 4,521,549 (1985); Adkins, U.S. Pat. No. 4,822,830; and Kunieda et al., U.S. Pat. No. 5,369,161 (1994). It has also been proposed to use alumina hydrate as an additive for other purposes, such as improving flame retardancy: Bobear, U.S. Pat. No. 4,288,360 (1981). The alumina hydrate is sometimes combined with other additives, such as other metal oxides or phosphorus compounds.

Another class of additives are the platinum compounds, which are normally used for improving flame retardancy: Laur et al., U.S. Pat. No. 3,635,874 (1972); Pfeifer et al., U.S. Pat. No. 3,711,520 (1973); Milbert, U.S. Pat. No. 3,821,140 (1974); Bargain, U.S. Pat. No. 3,839,266 (1974); Hatanaka et al., U.S. Pat. No. 3,862,082 (1975); Itoh et al., U.S. Pat. No. 3,936,476 (1976); Matsushita, U.S. Pat. No. 4,110,300 (1978); Bobear, U.S. Pat. No. 4,288,360 (1981); Ackermann et al., U.S. Pat. No. 4,419,474 (1983); and Derwent WPI Abstract No. 76-82267X/44 (abstract of JP-50-097644 (1975)). Again, other additives may be simultaneously employed, either for flame retardancy also or for other purposes such as heat stabilization or tracking/erosion resistance.

Lastly, many other additives have been added to organopolysiloxanes, for diverse purposes ranging from the aforementioned ones to thermal conductivity, reinforcement, and high temperature stability. These additives include metal oxides, silica, and metal salts. Exemplary disclosures in this vein are: Koda et al., U.S. Pat. No. 3,884,950 (1975); Cole et al., U.S. Pat. No. 4,604,424 (1986); Szaplonczay et al., U.S. Pat. No. 4,897,027 (1990); Wolfer et al., U.S. Pat. No. 5,008,317 (1991); Bosch et al., U.S. Pat. No. 5,023,295 (1991); Mazeika et al., WO 95/06552 (1995); Rowe et al., EP 0,218,461 A2 (1987); and GB 1,538,432 (1979). In summary, an organopolysiloxane used as a high voltage insulating material may contain a complex additive package.

An organopolysiloxane may be formed into a complex shape for a particular end use. For instance, the aforementioned Mazeika WO '552 discloses a high voltage insulator having a shedded organopolysiloxane housing which has been molded by a process leaving no longitudinal mold lines (which are more susceptible to tracking failure). The combination of the critical placement of the mold lines and the complex shape of the molded part places stringent demands on the organopolysiloxane. It must flow readily enough to properly fill the mold cavity and, after molding, be sufficiently compliant to demold. However, many prior art anti-tracking additives interfere with the molding process for one reason or another. Alumina hydrate makes the molded part difficult to demold, especially at the loading levels needed for effectively improving antitracking resistance, about 15 parts per hundred by weight or greater, usually more than 100 phr in commercial embodiments. In our experience, alumina hydrate levels greater than 75 phr make demolding difficult. Many moldable organopolysiloxane compositions are cured (crosslinked) in the mold by via a vinyl-hydride addition reaction:

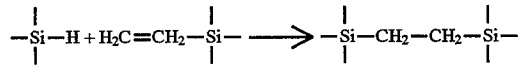

Curing may be effected by a platinum catalyst, such as hexachloroplatinic acid. Amounts of platinum in excess of those used for curing may be used an additive; however, in such instances the platinum additive may also catalyze the curing reaction, leading to premature curing, or scorching. Another disadvantage of platinum as an additive is its high cost.

Further, greater and greater performance demands are placed on high voltage insulating materials, for example where power generating or distribution plants are built in polluted coastal areas—locations where tracking and erosion are particularly severe problems. Consequently, there is a need for more effective anti-tracking packages which do not exhibit the limitations of prior art packages.

SUMMARY OF THE INVENTION

The present invention provides a tracking and erosion resistant organopolysiloxane composition that is readily moldable into complex shaped articles. Many of these compositions also have tracking and/or erosion resistance properties which are markedly superior to those of the prior art. Such composition comprises (a) 100 parts by weight of organopolysiloxane;

(b) between 1 and 15 parts by weight of magnesium oxide;

(c) between 15 and 45 parts by weight of zinc oxide; and (d) between 5 and 40 parts by weight of iron oxide.

BRIEF DESCRIPTION OF THE DRAWING(S)

FIG. 1 shows a mold suitable for molding a complex shaped insulator made of a composition of this invention.

DESCRIPTION OF THE PREFERRED EMBODIMENTS

Figure 1:
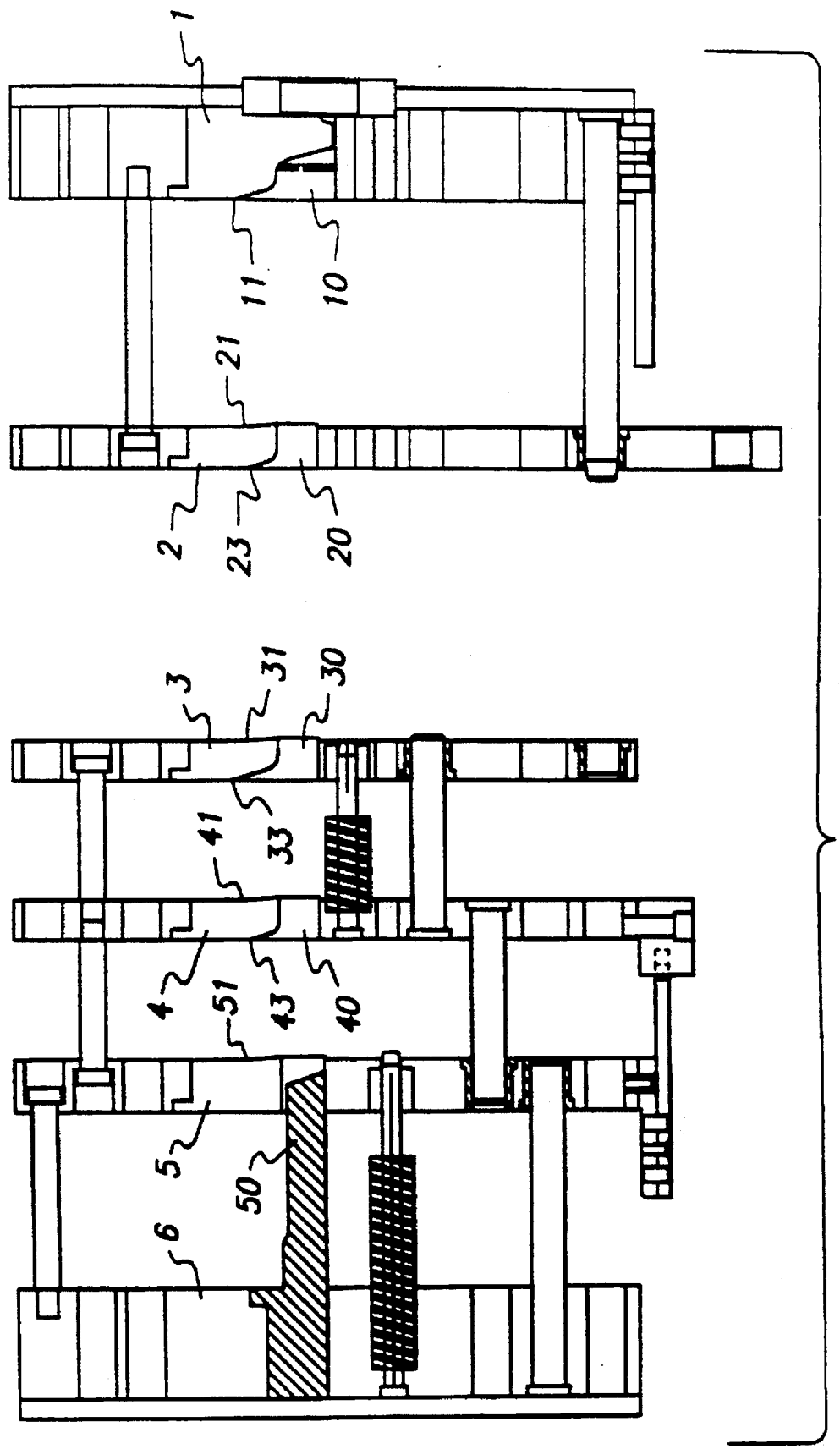

The organopolysiloxanes employed in this invention have a predominant repeat unit of the structure

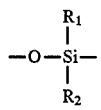

wherein $R_1$ and $R_2$, which may be the same or different, are monovalent hydrocarbon or halogenated hydrocarbon radicals having 1 to 30 carbon atoms, such as methyl, ethyl, propyl, 3,3,3-trifluoropropyl, and phenyl, with methyl being preferred. A preferred organopolysiloxane is polydimethylsiloxane, that is, $R_1$ and $R_2$ each are methyl. For curing, the polymer contains reactive functional groups, such as vinyl and hydride, positioned at terminal positions in the polymer chain or at branching point within the polymer chain. The curing chemistry typically is either platinum or peroxide catalyzed. Such organopolysiloxanes are well known and are available in a large selection of grades from many suppliers, such as gums Q44758 and Q44768 available from Dow Coming STI, preferably blended to a durometer Shore A hardness (ASTM D2240) of between 45 and 60. The present invention is especially suitable for organopolysiloxanes which are cured by a hydride addition chemistry with platinum catalysis. After curing (3 min at 350° F., 4 hr post cure at 400° F.) the organopolysiloxane preferably has an elongation greater than 400%, when tested according to ASTM D412 at 20 in/min. The Die B tear strength is preferably greater tan 100 pounds per linear inch (phr), preferably greater than 130 pli, most preferably greater than 150 pli.

We have discovered that the magnesium oxide synergistically and unexpectedly works with the zinc and iron oxides to provide exceptional tracking and erosion resistance, without adversely affecting demoldability, as might be the case with ALTH. The amount of magnesium oxide should be between 1 and 15, preferably between 2 and 7, parts by weight per 100 parts by weight of organopolysiloxane (phr). A preferred magnesium oxide is in the form of a powder at least 94.5% pure, with at least 99% passing through a 325 mesh size sieve, and an average surface area greater than 32 $m^2/g$.

The amount of zinc oxide present is preferably between 15 and 45, preferably between between 15 and 25 phr. A preferred zinc oxide is in the form of a powder at least 99.63% pure, with at least 99.99% passing through a 325 mesh size sieve, and an average surface area of at least 7.5 $m^2/g$.

Among the iron oxides, red iron oxide ($Fe_2O_3$) is preferred. The amount of iron oxide is preferably between 5 and 40, preferably between 5 and 20 phr, and most preferably between 5 and 10 phr. The iron oxide is conveniently added from a masterbatch in an organopolysiloxane gum.

Preferably, the tracking and erosion resistant compositions of this invention consist essentially of the organopolysiloxane (including any catalysts needed for the curing process), the first oxide material, and the second oxide material. However, so long as they do not materially affect the basic and novel characteristics of this invention, other additives may be present, for example fillers (reinforcing or non-reinforcing), stabilizers, thermally conductive filler, flame retardants, and pigments. Exemplary specific other additives include titanium dioxide, cerium oxide, alumina hydrate, fumed silica, and carbon black. Preferably the composition is free of platinum, except that which is needed as a catalyst for the curing reaction. Generally, the amount of platinum needed for catalysis is between 15 and 30 parts by weight per million parts by weight of organopolysiloxane (parts per million, or ppm). As previously noted, alumina trihydrate has a tendency to negatively affect the moldability of the organopolysiloxane, especially at the high loadings required for maximum anti-tracking effect. While some alumina trihydrate may optionally be added to the composition of the instant invention, no particular benefits accompany such addition, and, indeed, its addition in amounts greater than 75 phr is undesirable from a moldability point of view and should be avoided. Preferably a composition of this invention is esssentially free of anti-tracking additives other than the aforementioned magnesium oxide, zinc oxide, and iron oxide. A filler such as Minusil™ silica may be present in an amount of about 5 to 20 phr (parts by weight per 100 parts by weight of organopolysiloxane).

The tracking and erosion resistance of an insulating material can be quatitatively evaluated by the procedure published in ASTM D2303-90. Basically, this procedure measures the resistance of an insulating material to voltage stresses along its surface when wet with an ionizable, electrically conductive liquid contaminant, conditions which simulate exposure to dirt and condensed atmospheric moisture during service. The test method is of the inclined plane type, in which a contaminant solution is dripped onto a test specimen held at a 45° angle while a voltage is simultaneously applied. A voltage is applied in 250 V increments, with a hold period of 1 hr at each increment (unless a failure is indicated). The time and voltage at which failure eventually occurs is noted. The following procedure is representative: Samples were abraded with 400 A grit silicon carbide paper and rinsed with distilled water. The initial tracking voltage method of ASTM D2303 was followed, starting at 2.5 kV and a contaminant flow rate of 0.15 mL/min. The contaminant was 0.1% ammonium chloride. The voltage was increased by 0.25 kV every hour, reaching 4.0 kV at the 6th hour. The voltage was held constant at 4.0 kV after that and both the tracking voltage and the failure time were recorded. The contaminant flow rate was changed according to Table I in ASTM D2303.

The compositions of this invention have utility as insulating materials in high voltage electrical equipment, for example insulators, surge arresters, elbows, joints, terminations, transformer bushings, fuse cut-outs, and disconnect switches. As noted above, the compositions of this invention have excellent demoldability, making them especially suitable for molding parts with complex designs, such as shedded insulators, particularly ones which are free of longitudinal mold lines.

A molding process for making such insulators is described in Mazeika, WO 95/06552 (1995), the disclosure of which is incorporated herein by reference. In this process, the elastomeric properties of the material permit the use mold plates which join substantially perpendicular to the longitudinal axis of the part, enabling the creation of parts where the mold line flash material is along the periphery of the extremities of the sheds, reducing the need for buffing and cycle time while leading to increased tracking resistance. In addition, compositional variations of the composition at the mold line on the extremities have little or no effect on shed performance. The elastomeric molding material permits the molded multiply radially walled part to pop through the molding plates especially upon the application of a vacuum to the internal structure of the tubular molded part during extraction from the mold.

The molding process may be further understood by reference to FIG. 1, which shows a mold comprising plates 1, 2, 3, 4, 5, and 6 and a tubular forming insert 50 emanating from plate 6. The sheds or at least provisions for the sheds of the molded part are illustrated in elements 10, 20, 30 and 40 of FIG. 1 while the tubular nature is derived from the insert 50. The mold lines or flash points for the material instead of being along the longitudinal axis of the part occurs between 11 and 21, 23 and 31, 33 and 41, 43 and 51, respectively, upon the closing of the mold and injecting of the elastomeric composition. During the operation of the molding, plates 1, 2, 3, 4, 5, and 6 are brought together with sufficient pressure, heat, time, and temperature for the injection and curing of the elastomeric material.

The molding process may be carried out with an Engel 165 ton injection molding machine with vertical plattens or like machines. The Engel 165 machine was modified for the ejection of the part from a side of the mold as well as the need to move the plates. The reason for this modification is that the machine's opening stroke/daylight between the plattens when completely open must provide space for the operator or robots between at least two plates such as plate 2 and plate 3 as well as plate 1 and plate 2 to be able to remove the part from plate 2. Other equipment like a shuttle press or a rotary press can be used and is preferred for manufacturing of higher volumes mainly due to the ease of adding more plates to the mold or more radial shed elements or other details and to reduce the ware on mold leader pins. The support for the mold would be very simple on a shuttle or rotary table while providing greater ability to open the plates and withdraw the part. The molding machine barrel is heated to approximately 49° C. and the barrel temperature can be adjusted up or down depending upon the mold temperature as well as the part size and the gating/venting of the mold from 15° C. A suitable molding time is a 2 minute cycle from clamping to unclamping to re-clamping that is from closing of the mold injecting the material molding the material and opening of the plate, removal of the finished part and reclosing to start a new cycle. The cycle time more specifically depends on the barrel temperature, the composition used in the mold, and the mold temperature.

During the actual molding operation a suitable molding temperature is about 149° C. to about 204° C., preferably 160° C. to 193° C., and most preferably about 182° C. Having described the overall sequence, the following description follows the cycle of the mold once the mold plates are closed and pressed together. With a closed mold, the preferred elastomeric material of the invention is injected and has an average cure time of about 1 minute. Thereafter, the mold is opened between plates 5 and 6 and the core attached to plate 6 is pulled out of the part. The rest of the mold is held together using latch-locks and an injector system on a side of the press as well as springs. Subsequently, mold plates 4 and 5 open via a stripper bolt to free these sections. Subsequent to this operation, molding plates 3 and 4 open which free the section of the part collapse in a space where the core is removed and pulled through plate 4. After the part is pulled through plate 4, the mold is further opens between plates 3 and 2 and the part is pulled through plate 3 as in the prior step. The mold opening plates continues for plates 1 and 2 with the mold in a completely open position, the part is on the side of the plate facing plate 3 at which point the mold operator or robot is capable of removing the part from between open plates 2 and 3.

The present invention can be further understood by reference to the following examples, which are provided by means of illustration and not limitation. Table I provides exemplary formulations according to the invention, along with comparative examples not according to this invention. Samples were prepared by mixing in a 3 liter sigma blade mixer at room temperature. The gums were pre-mixed until homogeneous. Fillers and additives were then added and mixed until well dispersed. Formulae 1 through 4 are according to this invention, with formulae 1 through 3 being examples of platinum cured systems and Formula 4 being an example of a peroxide cured system. Formulae 5 through 9 are comparative examples not according to example. In Formula 5, the amount of magnesium oxide is too low. In Formula 6, the amount of magnesium oxide is higher than prescribed. In Formula 7, there is no iron oxide. In Formula 8, there is no magnesium oxide. In Formula 9, there is no zinc oxide. Table II provides the tracking and erosion data for the formulae of Table I.

TABLE I

| Component | | Formula 1 | Formula 2 | Formula 3 | Formula 4[IX] | Formula 5 | Formula 6 | Formula 7 | Formula 8[X] | Formula 9[X] |
|---|---|---|---|---|---|---|---|---|---|---|
| Silicone base[I] | (pbw)[a] | 100 | 100 | 100 | 100 | 100 | 100 | 100 | 100 | 100 |
| Silicone gum[II] | (pbw)[a] | 3 | 3 | 3 | 3 | 3 | 3 | 3 | 3 | 3 |
| Inhibitor[III] | (pbw)[a] | 0.3 | 0.3 | 0.3 | 0 | 0.3 | 0.3 | 0.3 | 0.3 | 0.3 |
| Hydride crosslinker[IV] | (pbw)[a] | 4.75 | 2.2 | 2.2 | 0 | 2.2 | 2.2 | 4.75 | 4.75 | 2.2 |
| Total silicone | (pbw)[b] | 115.55 | 113 | 115.55 | 110.5 | 113 | 110.5 | 115.55 | 113.05 | 110.5 |
| Platinum catalyst | (phr)[c] | 0.39 | 0.31 | 0.18 | 9 | 0.40 | 0.41 | 0.18 | 0.13 | 0.14 |
| Silica[V] | (pbw)[a] | 10 | 10 | 10 | 10 | 10 | 10 | 10 | 10 | 10 |
| Iron oxide | | | | | | | | | | |
| Masterbatch[VI] | (pbw)[a] | 15 | 15 | 15 | 15 | 15 | 10 | 0 | 10 | 10 |
| Actual iron oxide | (phr)[d] | 6.49 | 6.64 | 6.49 | 6.79 | 6.64 | 4.52 | 0 | 4.42 | 4.52 |
| Zinc oxide[VII] | (pbw)[a] | 25 | 25 | 25 | 25 | 25 | 25 | 32.5 | 15 | 0 |
| | (phr)[c] | 21.64 | 22.12 | 21.64 | 22.62 | 22.12 | 22.62 | 30.08 | 13.27 | 0 |
| Magnesium oxide[VIII] | (pbw)[a] | 3 | 7 | 3 | 3 | 1 | 20 | 3 | 0 | 2.5 |
| | (phr)[c] | 2.60 | 6.19 | 2.60 | 2.71 | 0.88 | 18.10 | 2.78 | 0 | 2.26 |

[I]Q44758 and Q44768, from Dow Corning STI
[II]SQM35, from Dow Corning STI
[III]ETCH, Dow Corning STI
[IV]No. 63570, Dow Corning STI
[V]Minusil ™ SM
[VI]50% Mapico 567A silicone gum/50% red iron oxide
[VII]No. 20553-2, Aldrich Chemical
[VIII]Maglite K, Calgon TABLE I-continued

| Component | Formula 1 | Formula 2 | Formula 3 | Formula 4[IX] | Formula 5 | Formula 6 | Formula 7 | Formula 8[X] | Formula 9[X] |
|---|---|---|---|---|---|---|---|---|---|

[IX] Additionally contains Varox peroxide
[X] Additionally contains 10 pbw titanium oxide
[a] Parts by weight
[b] Total of silicone base plus silicone gum plus inhibitor plus hydride crosslinker plus one-half of iron oxide masterbatch.
[c] Parts by weight per hundred parts by weight of total silicone
[d] Parts by weight red iron oxide in masterbatch per hundred parts by weight of total silicone

TABLE II

| Property Measured | Formula 1 | Formula 2 | Formula 3 | Formula 4 | Formula 5 | Formula 6 | Formula 7 | Formula 8 | Formula 9 |
|---|---|---|---|---|---|---|---|---|---|
| Initial tracking voltage (kV) | 4.00 | 4.00 | 4.00 | 3.00 | 4.00 | 3.00 | 3.50 | 4.00 | 4.00 |
| Tracking erosion time (min) | | | | | | | | | |
| Low value[a] | 840 | 840 | 840 | 156 | 462 | 143 | 288 | 442 | 477 |
| High value[a] | 840 | 840 | 840 | 719 | 840 | 840 | 840 | 840 | 840 |
| Average of 10 samples | 840 | 840 | 840 | 432 | 802 | 359 | 417 | 781 | 687 |
| Erosion (% wt loss) | | | | | | | | | |
| Low value | 0.41 | 0.24 | 0.50 | 0.91 | 1.19 | 0.50 | 0.60 | 0.51 | 0.69 |
| High value | 0.67 | 0.76 | 3.10 | 4.33 | 1.99 | 3.10 | 1.52 | 3.60 | 5.95 |
| Average of 10 samples | 0.55 | 0.40 | 1.56 | 1.85 | 1.53 | 1.56 | 1.04 | 1.32 | 2.67 |

[a] Test discontinued at 840 min when samples still did not fail.

It is noted that the formulations according to this invention consistently exhibited high tracking erosion times, greater than 840 min. Conversely, the comparative formulae achieved an 840 min tracking time occasionally, but could not do so with consistency. Since consistent performance is important in high voltage materials, the superiority of the compositions of the instant invention is demonstrated.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various descriptions thereof relate to specific embodiments of the invention, it is to be understood that where a specific feature is disclosed in the context of a particular embodiment, such feature can also be used, to the extent appropriate, in the context of another embodiment, in combination with another feature, or in the invention in general.

What is claimed is:

1. A tracking and erosion resistant composition, comprising:

(a) 100 parts by weight of organopolysiloxane;

(b) between 1 and 15 parts by weight of magnesium oxide;

(c) between 15 and 45 parts by weight of zinc oxide; and (d) between 5 and 40 parts by weight of iron oxide.

2. A tracking and erosion resistant material according to claim 1, wherein the amount of magnesium oxide is between 2 and 7 parts by weight.

3. A tracking and erosion resistant material according to claim 1, wherein the amount of zinc oxide is between 15 and 25 parts by weight.

4. A tracking and erosion resistant material according to claim 1, wherein the amount of iron oxide is between 5 and 20 parts by weight.

5. A tracking and erosion resistant composition according to claim 1, which is essentially free of anti-tracking additive other than said magnesium oxide, said zinc oxide, and said iron oxide.

6. A tracking and erosion resistant composition according to claim 1, which is cured by of a vinyl-hydride platinum-catalyzed addition reaction.

7. A tracking and erosion resistant composition according to claim 1, which is cured by peroxide cure.

* * * * *